(12) United States Patent
Rehman et al.

(10) Patent No.: US 9,043,364 B2
(45) Date of Patent: *May 26, 2015

(54) SYSTEM AND METHOD FOR PROVIDING AN INTELLIGENT CONFIGURATION RATIONALIZATION SOLUTION

(71) Applicant: JDA Software Group, Inc., Scottsdale, AZ (US)

(72) Inventors: Aamer Rehman, Flower Mound, TX (US); Jonathan Bier, Ashland, MA (US); Suriya Ganesan, Irving, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/028,173

(22) Filed: Sep. 16, 2013

(65) Prior Publication Data

US 2014/0019291 A1 Jan. 16, 2014

Related U.S. Application Data

(63) Continuation of application No. 12/055,100, filed on Mar. 25, 2008, now Pat. No. 8,538,996.

(60) Provisional application No. 60/909,519, filed on Apr. 2, 2007.

(51) Int. Cl.
| | |
|---|---|
| *G06F 7/00* | (2006.01) |
| *G06F 17/30* | (2006.01) |
| *G06Q 30/06* | (2012.01) |
| *G06Q 10/08* | (2012.01) |

(52) U.S. Cl.
CPC .......... *G06Q 30/0621* (2013.01); *G06Q 10/087* (2013.01)

(58) Field of Classification Search
CPC .......... G06Q 30/0621; G06Q 30/0633; G06Q 10/0875
USPC .......................................................... 707/795
See application file for complete search history.

(56) References Cited

U.S. PATENT DOCUMENTS

| | | | | |
|---|---|---|---|---|
| 5,839,112 | A * | 11/1998 | Schreitmueller et al. | 705/4 |
| 6,041,310 | A * | 3/2000 | Green et al. | 705/26.41 |
| 6,167,383 | A * | 12/2000 | Henson | 705/26.5 |
| 6,401,077 | B1 * | 6/2002 | Godden et al. | 705/26.8 |
| 6,704,749 | B2 * | 3/2004 | Palmer et al. | 1/1 |
| 6,795,810 | B2 * | 9/2004 | Ruppelt et al. | 705/27.1 |
| 6,813,531 | B2 | 11/2004 | Coale et al. | |
| 6,877,033 | B1 * | 4/2005 | Garrett et al. | 709/218 |
| 6,901,430 | B1 * | 5/2005 | Smith | 709/206 |
| 6,980,963 | B1 * | 12/2005 | Hanzek | 705/26.62 |
| 7,139,721 | B2 | 11/2006 | Borders et al. | |

(Continued)

FOREIGN PATENT DOCUMENTS

EP 1146465 10/2001

*Primary Examiner* — Binh V Ho
(74) *Attorney, Agent, or Firm* — Jackson White, PC; Steven J. Laureanti

(57) ABSTRACT

A system and method are disclosed for rationalizing configurations associated with one or more products. The system includes a database associated with one or more customers. The system further includes an order analysis system coupled with the database. The order analysis system is capable of rationalizing the differences between configurations of various combinations of options that are stored in the database.

20 Claims, 3 Drawing Sheets

(56) References Cited

U.S. PATENT DOCUMENTS

| | | | |
|---|---|---|---|
| 7,181,419 B1* | 2/2007 | Mesaros | 705/26.2 |
| 7,305,367 B1* | 12/2007 | Hollis et al. | 705/400 |
| 7,379,781 B2 | 5/2008 | Treichler et al. | |
| 7,437,306 B1* | 10/2008 | Bayer et al. | 705/7.33 |
| 7,548,794 B2 | 6/2009 | Vandergriff et al. | |
| 7,627,503 B1* | 12/2009 | Champagne et al. | 705/26.5 |
| 7,685,076 B2* | 3/2010 | Moore et al. | 705/400 |
| 7,818,221 B2 | 10/2010 | Fichtinger et al. | |
| 7,974,890 B2 | 7/2011 | Johnson et al. | |
| 8,117,088 B2* | 2/2012 | Brownell | 705/26.1 |
| 8,396,762 B2 | 3/2013 | Esau et al. | |
| 8,423,428 B2 | 4/2013 | Grendel et al. | |
| 2001/0047285 A1* | 11/2001 | Borders et al. | 705/8 |
| 2003/0149644 A1* | 8/2003 | Stingel et al. | 705/28 |
| 2003/0229550 A1* | 12/2003 | DiPrima et al. | 705/28 |
| 2004/0049433 A1* | 3/2004 | Yokoyama et al. | 705/26 |
| 2004/0059447 A1* | 3/2004 | Coale et al. | 700/97 |
| 2004/0249691 A1 | 12/2004 | Majure et al. | |
| 2005/0010495 A1* | 1/2005 | Shih et al. | 705/27 |
| 2005/0125261 A1* | 6/2005 | Adegan | 705/4 |
| 2005/0246246 A1* | 11/2005 | Nishimoto et al. | 705/28 |
| 2006/0111960 A1* | 5/2006 | Chess et al. | 705/10 |
| 2007/0050069 A1* | 3/2007 | Treichler et al. | 700/99 |
| 2007/0106412 A1* | 5/2007 | Esau et al. | 700/99 |
| 2007/0219982 A1* | 9/2007 | Piper et al. | 707/5 |
| 2008/0082427 A1 | 4/2008 | Gandhi et al. | |
| 2008/0109329 A1* | 5/2008 | Fichtinger et al. | 705/29 |
| 2008/0147486 A1* | 6/2008 | Wu | 705/10 |
| 2008/0195633 A1* | 8/2008 | Rose et al. | 707/100 |
| 2008/0255920 A1* | 10/2008 | Vandergriff et al. | 705/10 |
| 2009/0030708 A1* | 1/2009 | Glasglow | 705/1 |
| 2009/0167553 A1* | 7/2009 | Hong et al. | 340/825.29 |
| 2009/0192920 A1* | 7/2009 | Johnson et al. | 705/27 |

\* cited by examiner

SYSTEM AND METHOD FOR PROVIDING AN INTELLIGENT CONFIGURATION RATIONALIZATION SOLUTION

CROSS-REFERENCE TO RELATED APPLICATIONS

This application is a continuation of U.S. patent application Ser. No. 12/055,100, filed Mar. 25, 2008 now U.S. Pat. No. 8,538,966, entitled "System and Method for Providing an Intelligent Configuration Rationalization Solution" which claims priority under 35 U.S.C. §119(e) to U.S. Provisional Application No. 60/909,519, filed Apr. 2, 2007, and entitled "System and Method for Providing an Intelligent Configuration Rationalization Solution." U.S. patent application Ser. No. 12/055,100 and U.S. Provisional Application No. 60/909,519 are assigned to the assignee of the present application. The subject matter disclosed in U.S. patent application Ser. No. 12/055,100 and U.S. Provisional Application No. 60/909,519 is hereby incorporated by reference into the present disclosure as if fully set forth herein.

TECHNICAL FIELD

This invention relates generally to configuration rationalization, and more particularly to a system and method for providing an intelligent configuration rationalization solution.

BACKGROUND

In today's demand driven business world, customers are asking for more product options and choices, which have resulted in the proliferation of options available for each configuration. This problem is particularly acute for manufacturers producing products with high configuration content including automotive, industrial products, telecommunications equipment, and industrial machinery. For example, because of the proliferation of options, manufacturers find it very difficult to determine which combination of options should be packaged together to address particular market needs, minimize reconfigurations and inventory costs, and lost revenue due to unfulfilled demand. Today, manufacturers lack a proactive and forward looking process that allows them to evaluate trends of option consumption by customers and determine which combination of options should be packaged together. This inability to proactively determine which combination of options should be packaged together is undesirable.

SUMMARY

A system of rationalizing configurations associated with one or more products is disclosed. The system includes a database associated with one or more customers. The system further includes an order analysis system coupled with the database. The order analysis system is capable of rationalizing the differences between configurations of various combinations of options that are stored in the database.

A method of rationalizing configurations associated with one or more products is also disclosed. The method provides for accessing a user interface comprising a visual representation of a plurality of filter criteria elements and one or more configuration listings elements. The method further provides for selecting one or more filter criteria elements for searching a database for configurations of various combinations of options and searching the database for configurations of various combinations of options based on the selected filter criteria elements. The method still further provides for displaying the search results in the one or more configuration listings elements and storing the configurations of various combinations of options in the database.

A non-transitory computer-readable medium embodied with software for rationalizing part configurations of one or more products is also disclosed. The software is configured to access a user interface comprising a visual representation of a plurality of filter criteria elements and one or more configuration listings elements. The software is further configured to select one or more filter criteria elements for searching a database for configurations of various combinations of options and search the database for configurations of various combinations of options based on the selected filter criteria elements. The software is still further configured to display the search results in the one or more configuration listings elements and store the configurations of various combinations of options in the database.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
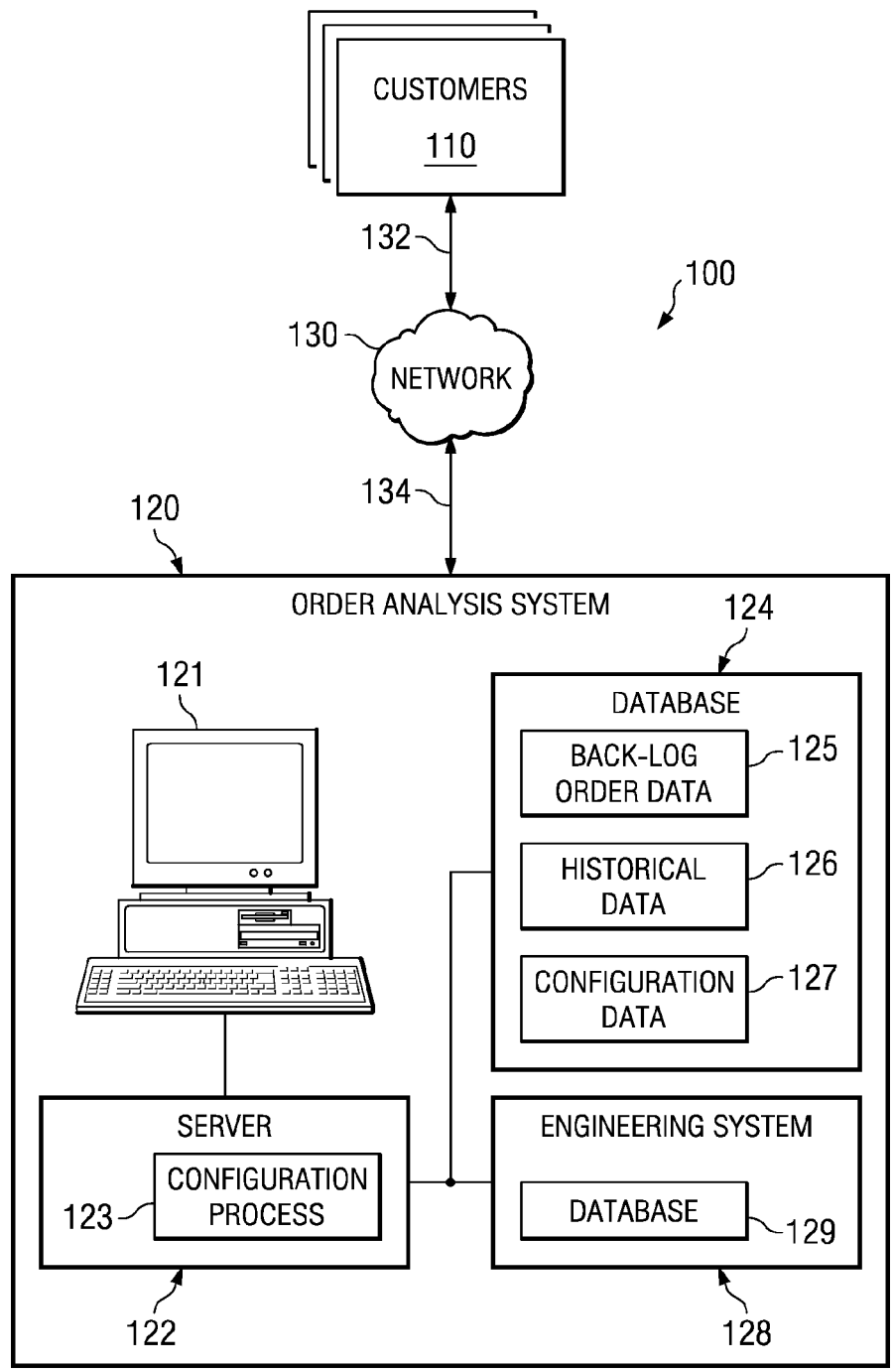
FIG. 1 illustrates an exemplary system according to a preferred embodiment.

FIG. 1 illustrates an exemplary system 100 according to a preferred embodiment. System 100 comprises one or more customers 110, an order analysis system 120, a network 130, and communication links 132 and 134. Although one or more customers 110, a single order analysis system 120, and a single network 130, are shown and described; embodiments contemplate any number of customers 110, any number of order analysis systems 120, and/or any number of networks 130, according to particular needs. In addition, or as an alternative, order analysis system 120 may be integral to or separate from the hardware and/or software of anyone of the one or more customers 110.

In one embodiment, system 100 may provide an intelligent mechanism for determining optimum configurations of various combinations of options, which may be synchronized with, for example, market demand. In addition, or as an alternative, system 100 may provide specific information about the usage of these various combinations of options, such as, for example, information about the frequency of the consumption of these combinations of options and/or information about the percentage of market demand for these combinations of options. As described below, system 100 may be used to access, store, and display information associated with particular data relating to a rationalization process of configurations based on various combinations of options.

Order analysis system 120 comprises one or more computers 121, a server 122, a database 124, and an engineering system 128. As described below in more detail, order analysis system 120 may generate a matrix of options, from data in database 124 (i.e., back-log order data, historical data, and other like data). Server 122 comprises configuration process 123 for comparing existing configuration option packages to provide analysis capabilities using various filter criteria and intelligent search mechanisms to identify optimum configurations.

Database 124 comprises one or more databases or other data storage arrangements at one or more locations, local to, or remote from, order analysis system 120. Database 124 may include, for example, back-log order data 125, historical data 126, and configuration data 127. Database 124 stores data associated with one or more customers 110 that may be used by server 122, and in particular, by configuration process 123. Data associated with database 124 may be, for example, data that describes the back-log of orders for one or more customers 110, data that describes the order history for one or more customers 110, and/or data that describes the configurations of various combinations of options for one or more customers 110. Engineering system 128 provides for the design and/or implementation of one or more of these various options or various combinations of options and includes a database 129 or databank, for storing data associated with these various combinations of options.

In an embodiment, system 100 may operate on one or more computers 121 that are integral to or separate from the hardware and/or software that support one or more customers 110, order analysis system 120, and/or network 130. Each of these one or more computers 121 may include any suitable input device, such as a keypad, mouse, touch screen, microphone, or other device to input information. In addition, each of these one or more computers 121 may include any suitable output device which may convey information associated with the operation of system 100, including digital or analog data, visual information, or audio information.

In addition, or as an alternative, each of these one or more computers 121 may include fixed or removable storage media, such as magnetic computer disks, CD-ROM, wireless ports and connections, or other suitable media to receive output from and provide input to system 100. Furthermore, each of these one or more computers 121 may include one or more processors and associated memory to execute instructions and manipulate information according to the operation of system 100.

In addition, although one or more computers 121 is shown as being associated with order analysis system 120, embodiments contemplate one or more customers 120 and order analysis system 120 each operating on one or more separate computers 121 or each operating on one or more shared computers 121, according to particular needs. Each of these one or more computers 121, may be, for example, a work station, personal computer (PC), network computer, notebook computer, personal digital assistant (PDA), cell phone, telephone, wireless data port, or any other suitable computing device.

In one embodiment, one or more users may be associated with one or more customers 110 and/or order analysis system 120. These one or more users may include, for example, a "product analyst" handling product rationalizing and/or one or more related tasks within system 100. In addition, or as an alternative, these one or more users may include, for example, one or more computers 121 programmed to autonomously handle product rationalizing and/or one or more related tasks within system 100. As an example only and not by way of limitation, one or more computers 121 may generate one or more baseline configuration recommendations automatically based on order trends and preferences made by the one or more users, thereby enabling a continual product rationalizing process.

In another embodiment, although one or more customers 110 and order analysis system 120 are shown and described as being separate from each other, embodiments contemplate combining one or more customers 110 and order analysis system 120, according to particular needs. For example, one or more customers 110 and/or order analysis system 120 may be entities within a single enterprise.

In one embodiment, one or more customers 110 are coupled to network 130 using communications link 132, which may be any wireline, wireless, or other link suitable to support data communications between one or more customers 110 and network 130 during operation of system 100. Order analysis system 120 is coupled to network 130 using communications link 134, which may be any wireline, wireless, or other link suitable to support data communications between order analysis system 120 and network 130 during operation of system 100. Although communication links 132 and 134 are shown as generally coupling one or more customers 110 and order analysis system 120 to network 130, one or more customers 110 and order analysis system 120 may communicate directly with each other, according to particular needs.

In another embodiment, network 130 includes the Internet and any appropriate local area networks (LANs), metropolitan area networks (MANS), or wide area networks (WANs) coupling one or more customers 110 and order analysis system 120. For example, data may be maintained by order analysis system 120 at one or more locations external to order analysis system 120 and one or more customers 110 and made available to one or more associated users of one or more customers 110 using network 130 or in any other appropriate manner. Those skilled in the art will recognize that the complete structure and operation of communication network 130 and other components within system 100 are not depicted or described. Embodiments may be employed in conjunction with known communications networks and other components.

Figure 2:
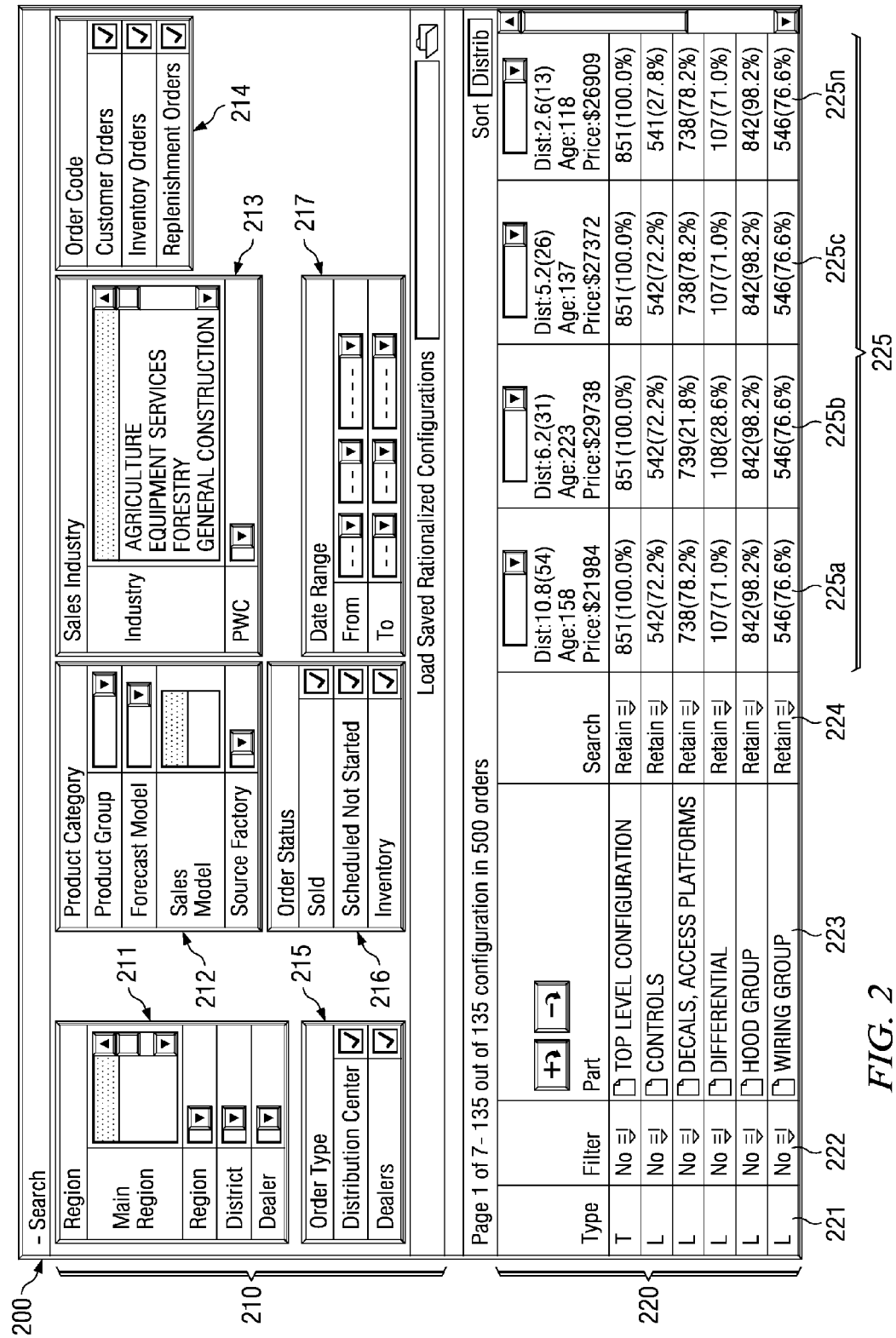
FIG. 2 illustrates a user interface for rationalizing configurations associated with one or more products.

FIG. 2 illustrates a user interface 200 for rationalizing configurations associated with one or more products. User interface 200 comprises one or more graphical user interface elements including one or more filter criteria 210 and one or more configuration listings 220. Although user interface 200 is shown and described as having one or more graphical user interface elements including a visual representation of a plurality of filter criteria 210 and a plurality of configuration listings 220, embodiments contemplate any suitable number of graphical user interface elements, according to particular needs. As will be explained below in greater detail, user interface 200 provides a user interface to allow one or more users the ability to rationalize differences between configuration packages (i.e., various combinations of options) based on various filter criteria 210 and update and/or eliminate existing configuration packages, according to particular needs.

In one embodiment, filter criteria 210 may provide the ability to search database 124 for configurations of various combinations of options based on various filter criteria. As an example only and not by way of limitation, filter criteria 210 may comprise region 211, product category 212, sales industry 213, order code 214, order type 215, order status 216, and date range 217. In addition, or as an alternative, filter criteria 210 may further comprise one or more drop down filters, providing one or more users with the ability to focus on specific criteria associated with filter criteria 210. Although, example filter criteria 210 is shown and described, embodiments contemplates any suitable filter criteria and/or any combination of filter criteria, according to particular needs.

Region 211 may provide for filtering of different region levels through a hierarchical relationship. In one embodiment, one or more users associated with one or more customers 110 may selectively expose portions of a region hierarchy, that is, a main region, a region, a district, and/or a particular dealer, during the process of selecting region 211. For example, one or more users associated with one or more customers 110 may select a main region, such as, for example, the United States, Europe, Latin America, or the like, then select a region within the main region, then select a district within the region, and then select a dealer within the district. The one or more users associated with one or more customers 110 may select at the highest main region level or select down to the lowest dealer within the main region. Although example regions 211 are shown and described, embodiments contemplate any suitable region and/or any combination of regions, according to particular needs.

Product category 212 may provide for filtering of different product categories through a hierarchical relationship. As an example only and not by way of limitation, a product group may include trucks, wherein the forecast model may be various models of the truck, such as, for example, a light duty truck, a heavy duty truck, and other like trucks. In addition, the sales model may include the specific light duty truck or specific heavy duty truck. The source factory may include the particular factory at which the particular sales model is built. Although example product categories 212 are shown and described, embodiments contemplate any suitable product category and/or any combination of product categories, according to particular needs.

Sales industry 213 may provide for filtering of different sales industries through a hierarchical relationship. For example, the specific light duty truck associated with product category 212 may be associated with various industries, such as, for example, agriculture, equipment services, forestry, general construction, road maintenance, and may be associated with a particular product work code (PWC). Although example sales industries 213 are shown and described, embodiments contemplate any suitable sales industry and/or any combination of sales industries, according to particular needs.

Order code 214 may provide for filtering of different order codes, such as, for example, customer orders, inventory orders, and/or replenishment orders. In addition, order codes 214 may provide visibility into the state of the order, such as, for example, is the order sold to a customer, is the order in inventory, is it a replenishment order, and the like. Although example order codes 214 are shown and described, embodiments contemplate any suitable order code and/or any combination of order codes, according to particular needs.

Order type 215 may provide for filtering of different order types, such as, for example, a distribution center order type and/or a dealer order type. In addition, the order type may provide visibility into whether, for example, the order came from an end dealer or from a distribution center. If the order came from the former, the order may not need to be restocked, whereas if the order came from the latter the order may need to be restocked and appropriate action may be taken by order analysis system 120. Although example order types 215 are shown and described, embodiments contemplate any suitable order type and/or any combination of order types, according to particular needs.

Order status 216 may provide for filtering of different order status, such as, for example, sold, scheduled not started, and/or inventory. In addition, order status 216 may provide visibility into the order status, that is, is the order sold, is the order scheduled (but maybe not started), is the order in inventory, and other like order status. Although example order status 216 are shown and described, embodiments contemplate any suitable order status and/or any combination of order status, according to particular needs.

Date range 217 may provide for filtering based on a particular date range. For example, the specific date range may be from a particular date to the present date, to a particular date, or all dates. Although example date range 217 is shown and described, embodiments contemplate any suitable date range and/or any combination of date ranges, according to particular needs.

In one embodiment, configuration listings 220 may provide the search results of database 124 for configurations based on filter criteria 210. As an example only and not by way of limitation, configuration listings 220 may comprise type 221, filter 222, part 223, search 224, and configurations 225. In addition, or as an alternative, configuration listings 220 may comprise a visual representation of the search results of filter criteria 210 in any type of tabular view. In addition, each tabular view may comprise a table including one or more rows and one or more columns. Although example configuration listings 220 are shown and described, embodiments contemplate any suitable configuration listing and/or any combination of configuration listings, according to particular needs.

Type 221 may identify different types of parts, for example, the part may be a top level part that is required, the part may be installed at the factory, or the part may be a dealer add-on. Filter 222 may provide a user interface workflow filter for reducing the number of items displayed in configuration listing 220. For example, if filter 222 is active, then one or more users associated with one or more customers 110 may selectively expose the appropriate categories. Likewise, if filter 222 is de-active, then one or more users associated with one or more customers 110 may selectively hide the appropriate categories. That is, by selectively hiding the appropriate categories, the underlying data remains unchanged, but the display of the underlying data is reduced based on the selection to hide the appropriate categories.

Part 223 may provide a category of parts through a hierarchical relationship, such as, for example, top level configuration, controls, decals, differentials, hood group, wiring group, and other like categories, including categorizing the individual part below the category of the part. In addition, each category of parts may be a single choice category, that is the category may only include one item, or a multiple choice category, that is, the category may include more than one item. As an example only and not by way of limitation, the wiring group category of parts may be a multiple choice category that may include sub-categories, such as controls, electrical, and operator environment. Furthermore, each of the sub-categories of parts may also contain multiple items within the sub-category. As an example, the sub-category electrical may include more than one item, such as a standard battery and a heavy duty battery.

Search 224 may provide one or more users associated with one or more customers 110 the ability to change the status of configurations 225 based on the value of search 224. As an example only and not by way of limitation, search 224 may comprise the value of retain, ignore, and standardize. That is, if the value of search 224 is retain, than the part from part 223 may be retained as a differentiating factor in the configurations. On the other hand, if the value of search 224 is ignore, than the option with the part from part 223 is ignored or removed, and the option no longer differentiates the configurations. Furthermore, if the value of search 224 is standardize, than the part from part 223 is standardized across all configurations. In addition, if the part from part 223 is associated with a multiple choice category, than each part within part 223 may be standardized based on the particular part identification number.

Configurations 225 may provide for a particular configuration of options, that is, a listing of the various part identification numbers that comprise the particular configuration associated with each category of parts. In addition, configurations 225 (i.e., columns 225a-225n) may also provide information regarding the distribution, age, and price details associated with each particular configuration. As an example only and not by way of limitation, configuration 225a may provide for a distribution of 10.8% (which may include a total of 54 orders out of the total number of orders) of the configurations in database 124 include this particular configuration of options (i.e., parts). As another example, configuration 225a may provide an average age of 158 days, that is, this particular configuration remained in inventory for 158 days. As still another example, configuration 225a may provide an average selling price of $21,984 for this particular configuration.

In addition, or as an alternative, configurations 225 may also provide information regarding the usage percentage of each option (i.e., parts) for this particular configuration. As an example only and not by way of limitation, configuration 225a may provide that part identification number 851 was used on 100% of the configurations in database 124. Although configurations 225 are shown and described as being displayed with various configurations and information associated with the various configurations, embodiments contemplate displaying any configuration, combination of configurations, and/or any information, according to particular needs.

To further explain the operation of user interface 200, an example is now given. In the following example, a user associated with one or more customers 110 may conduct a configuration rationalization process, that is, the user may rationalize the differences between various configuration packages (i.e., various combinations of options) based on selected filter criteria and update and/or eliminate existing configuration packages, according to particular needs. In conducting the configuration rationalization process, the user may select filter criteria 210 in order to perform the filtering of database 124 (i.e., data that describes the back-log of orders, data that describes the order history for one or more customers 110, and data that describes the configurations of various combinations of options) according to different region levels, different product categories, different sales industries, different order codes, different order types, different order status, and different date ranges.

Continuing with this example, the user may select various filter criteria 210 and then search database 124 via configuration process 123, to display the search results, based on the user selected filter criteria 210. In a similar manner, once the search results of database 124 are displayed, the user may select and/or deselect additional filter criteria 210 to modify and/or change the number of items displayed in configuration listings 220.

In addition, or as an alternative, once the search results of database 124 are displayed in configuration listings 220, the user may then rationalize the differences between various configurations (i.e., various combinations of options) displayed in configuration listings 220. As an example only and not by way of limitation, the user may modify and/or change the user interface workflow filter and the status of configurations 225 based on retaining, ignoring, or standardizing various combination of options (i.e., parts). In addition, user interface 200 may provide a histogram (i.e., search history) of the distributions of the various configurations displayed in configuration listings 220. For example, the histogram may provide the number of configurations and the distribution of the configurations used based on a percentage.

Modifications, additions or omissions may be made to user interface 200 without departing from the scope of the invention. As an example and not by way of limitation, user interface 200 may have more, fewer, or other graphical elements, filter criteria or configuration listings. Moreover, the operation of user interface 200 may be performed by more, fewer, or other graphical elements, arranged in any suitable manner, according to particular needs.

Figure 3:
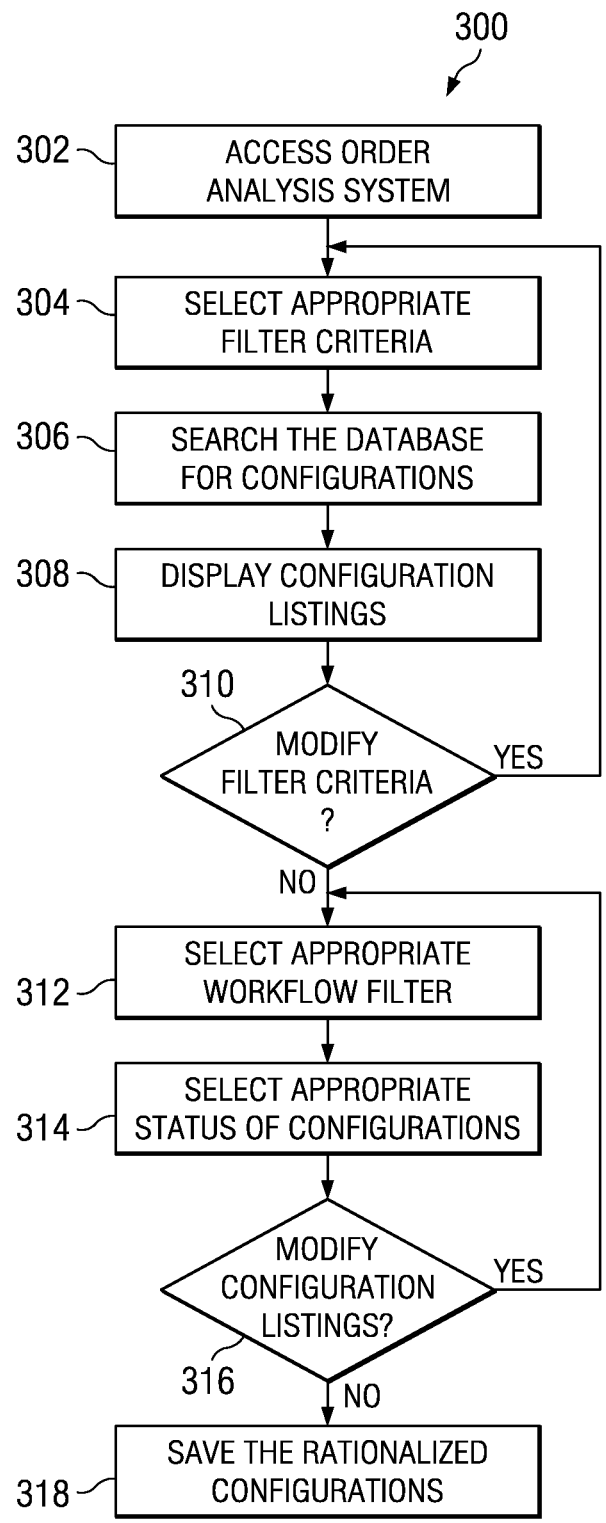
FIG. 3 illustrates an exemplary method for rationalizing configurations associated with one or more products.

FIG. 3 illustrates an exemplary method 300 for rationalizing configurations associated with one or more products. As discussed above, one or more users associated with one or more customers 110 may include a product analyst for rationalizing configurations associated with one or more products. Although a product analyst is described in this exemplary method, embodiments contemplate any suitable user, any suitable combination of users, and/or any suitable one or more computers 121 associated with one or more customers 110 for rationalizing configurations associated with one or more products.

The method begins at step 302, where a product analyst accesses user interface 200 via order analysis system 120. As discussed above, order analysis system 120 may generate a matrix of options from database 124 (i.e., a back-log order data set, a historical data set, and the like) and includes server 122 and configuration process 123 for comparing existing configuration option packages to provide analysis capabilities to a product analyst using various filter criteria and intelligent search mechanisms to identify optimum configurations. At step 304, the product analyst selects the appropriate filter criteria 210, which provides the ability to search database 124 for configurations of various combinations of options based on the selected filter criteria 210. As discussed above, data associated with database 124 may be, for example, data that describes the back-log of orders, data that describes the order history for one or more customers 110, and/or data that describes the configurations of various combinations of options. Once the product analyst selects the appropriate filter criteria 210, configuration process 123 searches database 124, at step 306 and the search results of database 124 are displayed in configuration listings 220, at step 308.

At step 310, a determination is made as to whether the product analyst may change and/or modify any of the originally selected filter criteria 210. If there are changes and/or modification to be made to filter criteria 210, configuration process 123 returns to step 304, so that the product analyst may change and/or modify any of the originally selected filter criteria 210. In this manner, the product analyst is able to reduce the number of configurations based on changes and/or modification to the originally selected filter criteria 210. If there are no changes and/or modification to be made to filter criteria 210, the method proceeds to step 312.

Once the search results of database 124 are displayed in configuration listings 220, the product analyst may then rationalize the differences between the various configurations (i.e., various combinations of options) displayed in configuration listings 220. At step 312, the product analyst may selectively expose or hide one or more appropriate categories displayed in configuration listings 220. As discussed above, if filter 222 is active, then the product analyst may selectively expose the appropriate categories displayed in configuration listings 220. Likewise, if filter 222 is de-active, then the product analyst may selectively hide the appropriate categories, such that the categories are not displayed in configuration listings 220. That is, by selectively hiding the appropriate categories, the underlying data remains unchanged, but the display of the underlying data is reduced based on the selection of the product analyst to hide the appropriate categories.

At step 314, the product analyst may selectively change the status of configurations 225 based on the value of search 224. As discussed above, search 224 may comprise the value of retain, ignore, and standardize. That is, if the product analyst selects retain to be the value in search 224, than the part from part 223 may be retained as a differentiating factor in the configurations. On the other hand, if the product analyst selects ignore to be the value in search 224 is ignore, than the option with the part from part 223 is ignored or removed, and the option no longer differentiates the configurations. Furthermore, if the product analyst selects standardize to be the value in search 224, than the part from part 223 is standardized across all configurations. In addition, as discussed above, if the part from part 223 is associated with a multiple choice category, than each part within part 223 may be standardized based on the particular part identification number.

At step 316, a determination is made as to whether the product analyst may change and/or modify any of configuration listings 220, in order to further rationalize the differences between the various configurations (i.e., various combinations of options) displayed in configuration listings 220. If there are additional changes and/or modification to be made to configuration listings 220, configuration process 123 returns to step 312, so that the product analyst may change and/or modify any of the configuration listings 220. In this manner, the product analyst is able to reduce the number of configurations based on changes and/or modification to configuration listings 220. If there are no changes and/or modification to be made to configuration listings 220, the method proceeds to step 318.

At step 318, the product analyst may store the rationalized configuration into configuration data 127 of database 124. In addition, the product analyst may repeat method 300 for rationalizing configurations based on market demands, reduction of inventory costs by reducing the number of different options, and/or removing obsolete or rarely used parts.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A configuration system comprising:
a computer system coupled with a database and comprising one or more processors and memory, the computer system comprising two or more filter criteria elements and one or more configurations, the two or more filter criteria elements comprising a product category criteria and an order code criteria, the one or more configurations comprise configuration data representing two or more options to configure one or more products using two or more parts, wherein the computer system:
analyzes one or more customer orders;
generates an option matrix based, at least in part, on the customer orders and the one or more configurations; and
rationalizes differences between the two or more options of the one or more products; and
an engineering computer system coupled with the computer system, the engineering computer system implements one or more products using the two or more parts based, at least in part, on the rationalization of the differences between the two or more options of the one or more products.

2. The system of claim 1, wherein the database comprises data that describes the back-log of orders of one or more customers associated with the one or more products.

3. The system of claim 1, wherein the database comprises data that describes the order history of one or more customers associated with the one or more products.

4. The system of claim 1, wherein the database comprises data that describes the two or more options offered by one or more customers associated with the one or more products.

5. The system of claim 1, further comprising a user interface that rationalizes the differences between the two or more options of the configuration data.

6. The system of claim 1, wherein the two or more filter criteria elements further comprises elements selected from the group consisting of:
a region criteria;
a sales industry criteria;
an order type criteria;
an order status criteria; and
a date range criteria.

7. A method, comprising:
analyzing, by an order analysis system, one or more customer orders, wherein the order analysis system comprises a database and two or more filter criteria elements comprising a product category criteria and an order code criteria;
generating, by the order analysis system, an option matrix based, at least in part, on the customer orders and one or more configurations comprising configuration data representing two or more options to configure one or more products using two or more parts;
rationalizing, by the order analysis system, differences between the two or more options of the one or more products; and
implementing, by an engineering computer system, one or more products using the two or more parts based, at least in part, on the rationalization of the differences between the two or more options of the one or more products.

8. The method of claim 7, wherein the database comprises data that describes the back-log of orders of one or more customers associated with the one or more products.

9. The method of claim 7, wherein the database comprises data that describes the order history of one or more customers associated with the one or more products.

10. The method of claim 7, wherein the database comprises data that describes the two or more options offered by one or more customers associated with the one or more products.

11. The method of claim 7, further comprising a user interface that rationalizes the differences between the two or more options of the configuration data.

12. The method of claim 7, wherein the two or more filter criteria elements further comprises elements selected from the group consisting of:
- a region criteria;
- a sales industry criteria;
- an order type criteria;
- an order status criteria; and
- a date range criteria.

13. The method of claim 7, wherein implementing, by an engineering computer system, one or more products using the two or more parts based, at least in part, on the rationalization of the differences between the two or more options of the one or more products comprises building, by a factory, one or more products using the two or more parts based, at least in part, on the rationalization of the differences between the two or more options of the one or more products.

14. A non-transitory computer-readable medium comprising software, the software when executed configured to:
- analyze one or more customer orders;
- generate an option matrix based, at least in part, on the customer orders and one or more configurations comprising configuration data representing two or more options to configure one or more products using two or more parts;
- rationalize differences between the two or more options of the one or more products using two or more filter criteria elements comprising a product category criteria and an order code criteria; and
- implement one or more products using the two or more parts based, at least in part, on the rationalization of the differences between the two or more options of the one or more products.

15. The non-transitory computer-readable medium of claim 14, wherein the customer orders comprises a back-log of orders of one or more customers associated with the one or more products.

16. The non-transitory computer-readable medium of claim 14, wherein the customer orders comprises an order history of one or more customers associated with the one or more products.

17. The non-transitory computer-readable medium of claim 14, wherein the software is further configured to:
- receive data that describes the two or more options offered by one or more customers associated with the one or more products.

18. The non-transitory computer-readable medium of claim 14, wherein the software is further configured to:
- generate a user interface that rationalizes the differences between the two or more options of the configuration data.

19. The non-transitory computer-readable medium of claim 14, wherein the two or more filter criteria elements further comprises elements selected from the group consisting of:
- a region criteria;
- a sales industry criteria;
- an order type criteria;
- an order status criteria; and
- a date range criteria.

20. The non-transitory computer-readable medium of claim 14, wherein implement one or more products using the two or more parts based, at least in part, on the rationalization of the differences between the two or more options of the one or more products comprises build, by a factory, one or more products using the two or more parts based, at least in part, on the rationalization of the differences between the two or more options of the one or more products.

* * * * *